United States Patent [19]
Johnson

[11] Patent Number: 5,924,080
[45] Date of Patent: Jul. 13, 1999

[54] COMPUTERIZED DISCOUNT REDEMPTION SYSTEM

[75] Inventor: Glen Douglas Johnson, Little Rock, Ark.

[73] Assignee: Incredicard LLC, Cookeville, Tenn.

[21] Appl. No.: 08/654,057

[22] Filed: May 28, 1996

[51] Int. Cl.$^6$ .......................... G06F 15/21; G01G 19/415; H04N 7/00; H04H 9/00
[52] U.S. Cl. ................................ 705/26; 705/16; 705/14; 705/10; 235/380; 348/2; 348/13; 348/8
[58] Field of Search ...................................... 395/226, 214; 382/115; 235/385, 380; 380/23; 705/26, 14, 10; 364/746; 348/2, 13, 8; 463/9

[56] References Cited

U.S. PATENT DOCUMENTS

| | | | |
|---|---|---|---|
| 5,047,614 | 9/1991 | Bianco | 235/385 |
| 5,353,218 | 10/1994 | DeLapa et al. | |
| 5,613,012 | 3/1997 | Hoffman et al. | 382/115 |
| 5,671,279 | 9/1997 | Elgamal | 380/23 |
| 5,687,322 | 11/1997 | Deaton et al. | 395/214 |
| 5,710,887 | 1/1998 | Chelliah et al. | 395/226 |
| 5,724,279 | 3/1998 | Benaloh et al. | 364/746 |
| 5,729,693 | 3/1998 | Holda-Fleck | 395/214 |
| 5,732,400 | 3/1998 | Mandler et al. | 705/26 |

FOREIGN PATENT DOCUMENTS

| | | | |
|---|---|---|---|
| 0 313 376 | 4/1989 | European Pat. Off. | G01G 1/12 |

OTHER PUBLICATIONS

"Computers begin to solve the marketing puzzle", Business Week, Special Report, pp. 115–138, Apr. 17, 1965.
Seidenberg, J.P. and Mseka, A.I., "Proliferation of in–store, card–based marketing systems in place", Card News, v5, n8, pl (4), Apr. 23, 1990.

Primary Examiner—Allen R. MacDonald
Assistant Examiner—Pedro R. Kanof
Attorney, Agent, or Firm—Sheldon H. Parker

[57] ABSTRACT

The method of processing merchandise discounts by providing a computerized membership system is disclosed. At least one provider's computer has a database for the storage and retrieval of information. The database stores demographic information regarding merchants, manufacturers, and consumers in predetermined files. A communication system, such as a cash register, provides real time communication between members and the provider's computer. The consumer and merchandise identification codes are stored in the database, including the identification code of merchandise subject to a price discount. Discounted merchandise is displayed through media advertisement and/or notification proximate the merchandise. The consumer selects merchandise to purchase. The consumer membership card, containing the consumer's identification, and product code of the merchandise is scanned. The merchandise identification code is scanned and compared with the stored product identification codes of the discounted merchandise. The discounts are deducted and a slip printed. The merchandise and consumer information is sorted and stored in the database. The data is compiled and reports are generated when providing purchasing demographics using the data stored in the demographics database.

11 Claims, 2 Drawing Sheets

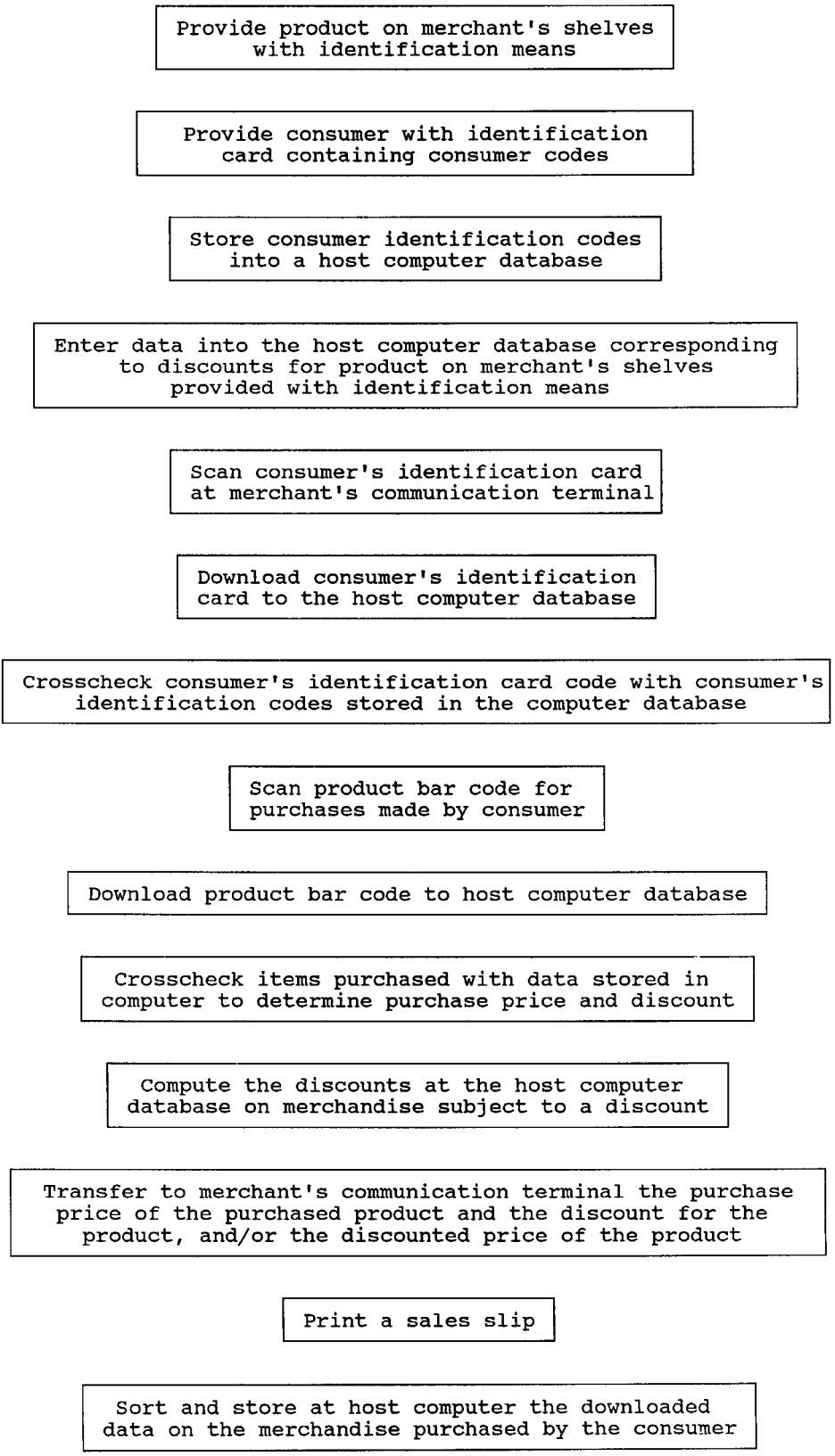

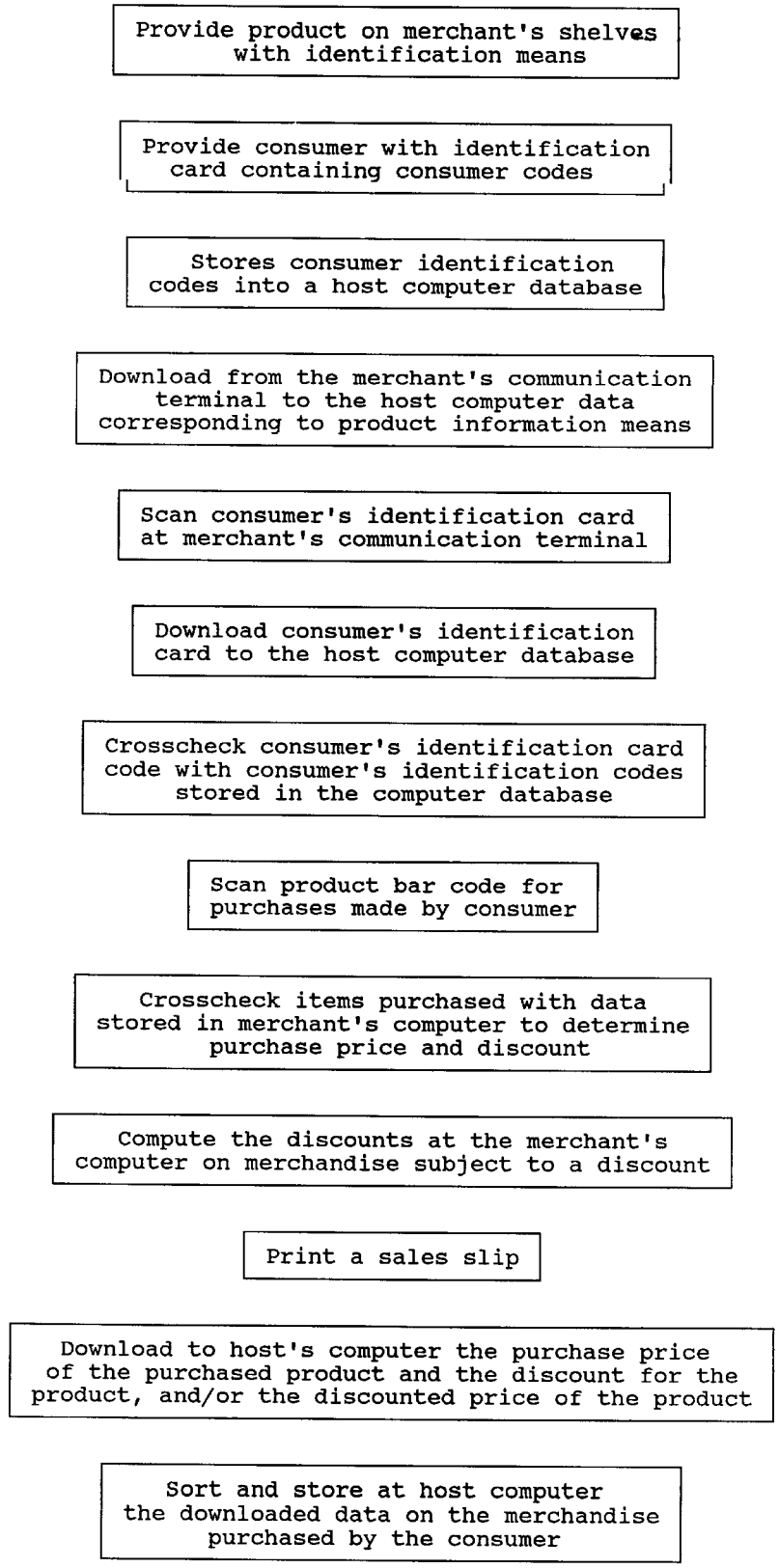

COMPUTERIZED DISCOUNT REDEMPTION SYSTEM

BACKGROUND OF THE INVENTION

1. Field of the Invention

The invention relates to the real-time system for providing in-store purchase discounts for predetermined products, without the use of coupons.

2. Brief Description of the Prior Art

Computer systems have been developed for either enhancing the ease of use of product discount coupons or eliminating the use of coupons altogether. The use of coupons has proliferated, as has the cost of coupon delivery to customers and the cost of tracking and accounting for the coupons.

U.S. Pat. No. 5,353,218 notes that discount coupons have long been distributed by manufacturers to merchandise their products and by retail stores to attract consumers to their particular store. Manufacturers and retailers both typically distribute coupons as free standing inserts in newspapers, hand-outs and mailers. The redemption rate of the coupons provided as free standing inserts, according to U.S. Pat. No. 5,353,218 was under 3 percent and decreasing, as of 1992. The processing of coupons is expensive and may, in some instances, negate the intended advantages of the coupon. Another problem is retailers intentionally, or inadvertently, accepting coupons although the customer has not purchased the required merchandise. The combination of the high cost of distribution of the coupons and consumer fraud, and the cost of reimbursing the retailer for accepting the coupon, renders the current system far less than perfect.

Accordingly, manufacturers have been searching for a system which is less prone to consumer fraud and less costly, while aggressively attracting consumers to their products.

SUMMARY OF THE INVENTION

It has now been found that a simple, low cost system can be provided by which manufacturers can discount selected products to consumers, in which system, the discount or rebate can only be applied to the purchase price of the product at the time of actual purchase of the product eliminating fraud and waste, tracking customer usage and building a valuable customer demographic database.

The method of processing merchandise discounts by providing a computerized membership system is disclosed. The membership system has at least one provider computer which has a database for the storage and retrieval of information. The database stores demographic information regarding merchants, manufacturers, and consumers in predetermined files. A communication system, such as a cash register, provides real time communication between members and the provider's computer.

The consumer identification codes are stored in the database as well as merchandise information provided by a manufacturer member. The merchandise information includes at least the identification code of merchandise subject to a price discount. Indicia identifying merchandise as being subject to a price discount is displayed to the consumers, through media advertisement and/or notification proximate the merchandise. The consumer selects identified merchandise and non-identified merchandise from a storage area to a first location at the merchant member. The product identification code of each of selected merchandise is scanned at the merchant communication system. The consumer membership card, which contains memory storage containing the consumer's identification code is also scanned. The consumer's identification code is downloaded to the provider's computer and compared with the stored consumer identification codes. The provider's computer terminates the deduction of merchandise accounts if the consumer identification code is not valid.

As the merchandise is scanned the merchandise identification code for each item is downloaded through the communication system where it is compared with the stored product identification codes of the discounted merchandise. The provider's computer deducts the discounts on the merchandise subject to a discount. The discounts on the merchandise are downloaded to the merchant communication system. A sales slip, either displaying the discounts, or alternatively displaying all information, is printed for the consumer.

The provider's computer sorts and stores the downloaded data on merchandise purchased by the consumer in the database. The provider's computer compiles consumer purchase data in a demographics database and provides demographic reports regarding purchasing demographics using the data stored in the demographics database.

The provider can be a centralized computer networked to multiple independent merchants or a centralized computer networked to at least one merchant terminal.

Alternatively, the identification code of the merchandise subject to a price discount can be downloaded to the merchant communication system. The product identification code of each of item is scanned and compared with stored merchandise identification codes. The discounts are deducted on the merchandise subject to a price discount and a sales slip printed. The merchandise information is downloaded to the provider's computer where the information is sorted and stored at the provider's computer.

BRIEF DESCRIPTION OF THE DRAWINGS

The advantages of the instant disclosure will become more apparent when read with the specification and the drawings, wherein:

FIG. 1 is a flow plan of a process according to the invention wherein a provider's host computer is used to process the information; and FIG. 2 is a flow plan of a process according to the invention wherein the merchant's computer is used to process the information and subsequently download the information to the host computer.

DETAILED DESCRIPTION OF THE INVENTION

The purpose of the process of the instant invention is to replace the paper coupon in both grocery and general merchant stores. To accomplish this, a centralized computer system is established to distribute, collect and organize information between the central system and the local merchants. Consumers join a couponless product discount system and are provided with an individualized membership card. The membership cards include a memory storage mechanism, such as an encoded magnetic stripe or other means known by those versed in the current art, which contains the consumer's membership information. The card also contains on the memory storage a coded signal which activates a systen such as available under the trademark VeriFone. The host computer telephone number is programmed into the VeriFone system at the given merchant location. Therefore, in a non-centralized system, a single code on the card of the instant invention can trigger a call to any number of host computers, depending upon the city in which the purchase is made or the type of merchant, as for example, a grocery store versus a general merchant.

It should be noted that herein the term "profiles", is used to indicate a database of demographic data relating to the purchasing of merchandise of any type. Further, for convenience, reference is made to grocery stores, however any type of retail or wholesale store or service can take advantage of the membership system.

The membership provider's centralized computer has a database which contains membership information, such as name, address, membership number, membership expiration date, and phone number. The merchant's portion of the centralized database contains such information as store name, location, membership number and phone number. The manufacturer's information contains information such as company name, specific product types, and specific product names and the standard price, a list of products to be currently discounted, the discount rate and length of time of the discount.

In the case of the grocery store application of the process, the membership provider contacts major food distributors and manufacturers to arrange for membership in the service. The service would eliminate the need for the distributors and manufacturers printing, distributing and advertising coupons. Rather the membership provider would, for a fee, provide these services. Food distributors and manufacturers who enroll in the system are included in the membership provider's advertising, which can include direct mailing, newspaper ads, radio and TV ads, as well as periodic directory or directory update magazines which list participating manufacturers and grocery store chains.

The database is preferably an interactive, continually self-upgrading system. In addition to automating product discounts, the system can be used to generate and store demographic information. To gain optimum advantage to the system, the database should have the capability of providing such demographic information as types of products sold within an area, product turn over by store and area, and members' purchasing profiles.

Members are informed of available product discounts through the membership provider's advertising, as well as notices within the store. For example, products in a grocery store which are currently discounted can be identified by shelf stickers or placards which bear the necessary symbol or other indicia of the service provider. The consumer thus sees certain products identified as being on special discount, serving to encourage the consumer to purchase the discounted item. Thus, whether-or-not the consumer was previously aware that a particular item is available at a discount, the consumer would become immediately aware of the discount status of the product, providing immediate motivation to purchase the product. This is advantageous to the store in that impulse buying increases due to the awareness of discounted items. From the standpoint of the consumer, the time required to go through the coupon section of the newspaper and cut out and organize coupons, is eliminated. Since most consumers are pressed for time, shoppers frequently do not utilize all the possible savings offered by manufacturers. This costs both the consumer and manufacturer money.

At the time of joining, the consumer provides the information which is pertinent to the established database. The customer is provided with a unique coded number which allows for sorting, i.e. state, county or town, etc. The consumer's purchases are subsequently linked to this code number to provide the consumer's individual purchasing profile. This purchasing profile can be used, by either the consumer or merchant, to track spending trends, budget spending or total accumulated savings.

To use the system, the consumer collects the items to be purchased and brings them to the check-out counter. At the check-out counter, the clerk enters the purchase information of the products into the cash register by either scanning the bar code or using other current entry methods. Since cash registers are in effect computer terminals for the entry of data into a central computer, the instant system can be incorporated into existing systems by scanning bar code pricing and reading the magnetic stripe on membership cards. After all of the purchases have been recorded into the cash register, the clerk scans the memory storage on the member's identification card.

The entry of the data on the consumer's membership card can activate the uplinking with the provider's central host computer, whereupon the validity of the consumer's membership is confirmed. Preferably all information, including member's ID and the discount information is maintained in the membership provider's central computer. The maintenance of centralized information allows for the membership card to be valid at all stores, rather than particular chains, as well as single entry of discount information into the single location. Further, in order to provide maximum national demographic information, all information must be centralized. Alternatively, the information can be maintained in the computer system for each grocery store chain. Individualized systems would require the consumer to obtain a membership at each chain. Manufacturers would have to gather demographic information from each individual chain and/or system to thoroughly evaluate the demographic information pertaining to their products.

The computerized cash register can batch load the bar codes of all products being purchased to the membership provider's, or other host, computer. The computer then cross checks the purchased products against the data base of manufacturer's discounts in the membership provider's, or host's, computer, comparing item sizes, brands, and the like, ascertaining the availability of a product discount. For those products that are subject to a discount, the system computer itemizes the discounts, totals the discounts and transfers the sum back to the computerized cash register. Optionally, the membership system can advise the consumer, by printing on their receipt, comparable brands that would have qualified for a discount. The membership system can also advise the cashier that the customer has chosen a wrong size product to qualify for the discount, thereby allowing for the correction to be made. The discount total is deducted from the total bill to the member-consumer. The member-consumer then pays the total purchase price of the goods, less the discount provided by the system.

Data can be stored either as only discounted items purchased or as all of the items purchased. As transactions are completed, the host computer takes the ID codes of the products and, linking the product ID codes to consumer ID codes, accumulates in the data base the listing of all products, which that particular member has purchased. As stated heretofore, this can be limited to products which are subject to the discount, or all product purchases, regardless of whether the discount is available. The computer can also record the time and date of purchases and thus build a detailed database of member purchase information. This database can be the source of information for demographics information about individual consumer profiles, general consumer profiles, or profiles of classes or categories of consumers.

The database of demographic data refers to data pertaining to the characteristics of human populations, such as size, growth, density, distribution, and vital statistics. The information in the database can thus be used to generate reports to participating manufacturers and merchants, showing customer and local buying trends. By knowing where certain products are being sold and who is buying these products, manufacturers have information as to who is buying their products and in what areas of the country certain products sell. Advertising costs can then be directed to either increase consumer awareness of a product or maintain the current rise of sales within a specific area. The available data also facilitates targeted mailing, thus eliminating the incredible amount of guess work which is associated with typical coupon mailings. The merchant or manufacturer can thus initiate a "customer loyalty" program that can reward a consumer based on that specific consumer's buying habits. The cost savings can produce higher profits and decreased consumer prices.

Consumers can use the database to obtain read outs of their spending habits for budgeting income or viewing spending trends. Rebates can also be incorporated into the system, providing the consumer with a "rebate printout" with the cash register receipt. Consumers also have the option of receiving a report as to the annual, or year-to-date savings generated through use of their membership card.

The data collected can also have significant value in enabling a grocery store and/or manufacturer to determine buying patterns, thereby increasing the accuracy of inventory stocking and delivery schedules. The information collected on the demographics database is more specific than that which can be obtained by prior art systems. The use of the instant system eliminates the handling of paper coupons, the accounting for the coupons, the need for the manufacturer to pay the grocery store for the coupons, the handling of the coupons, the waste associated with less than three percent of all distributed coupons being used, and coupon fraud. The consumer benefits by being provided with a report which shows how much money the consumer saved at given grocery stores and/or on given products for a specific period of time. The merchant or manufacturer can also choose to initiate a "buy three over three weeks, get one free" type of program. The database will store the number of products, and the time period within which they were purchased, for each particular customer. The database can automatically deduct the free product as though it were a 100% coupon, or advise the merchant in the event other methods are preferred.

The transaction time for a one hundred purchase transaction would take no more than thirty seconds, which is substantially less than the time required to match, or otherwise handle coupons, for a similar sized transaction. The transaction speed is limited by the modem speed of the terminal, the quality of the transmission lines, and the speed of the host computer. Each of these factors are progressively becoming faster, and thus the transaction speed will be constantly increasing.

The manufacturers will periodically upload the system with current product discounts. The accumulated demographic data, such as the specific number of times a given class product was purchased, or the specific number of times a given product within a class of products was purchased, can periodically be downloaded. The preferred flexibility of the database allows for the consumer, merchant and/or manufacturer to provide the personalized parameters for the data retrieval. Thus, the read out can provide information which is pertinent, based on the immediate requirements of the customer. This allows manufacturers to track the introduction of a new product, by area, in response to discounts, rebates, etc., while still maintaining standard surveillance over established products.

In the case of merchants who do not have the fully computerized cash registers, currently characteristic of small merchants, the system can be restricted to connection by a VeriFone or similar connection system. The connection system would allow for the non-computerized merchant to connect to the membership provider's centralized computer to verify a member's eligibility. Additionally, if applicable, there can be a determination of whether pre-set buying discount limits, or other restrictions have been reached. The membership provider's computer will then verify or approve the transaction to the merchant. Once a customer's eligibility has been determined, the merchant enters the items into the communication system for totaling and entry into the database. The total deduction would then be deducted from the consumer's total prior to payment. The data transferred from the general merchants can include all product information or can be limited to the amount of the transaction or other selected information.

The demographics database retrieval information provided to the merchant can either be provided by the membership provider's computer or accessed directly by the merchant, who is provided with access codes and a computer terminal. The membership provider can mail, or electronically transmit, the requested demographic information to the merchant on a prearranged schedule. Alternatively, the merchant can be provided with "on call" information which can be accessed at any time. This information can be predetermined information, which can include the number of discounted transactions, total number of transactions and the amount of sales generated for the merchant for a specific time period. Thus, the merchant will have readily accessible information as to the total dollar value of the transactions and the amount of the discount for sales to customers who are using the system of the instant invention. optionally, the merchant can be provided with a list of searchable parameters and be free to arrange the search as desired.

EXAMPLE I

In response to an advertising campaign, consumers are invited to become a member of the discount redemption service. Joining consumers are provided with a credit card-like plastic card having a memory storage area, such as a magnetic stripe; which contains the consumer ID code; information specific to the individual consumer. The consumer ID code can identify the consumer by an assigned account number, telephone number, or social security number. At the time of joining, the membership provider's computer is downloaded with the ID codes for each of the individual consumers. Consumers can either join the service directly through the provider or through individual participating merchants. In the event the consumer joins through a merchant, the merchant downloads all pertinent consumer information to the membership provider's computer in the predetermined format.

Manufacturers active in the redemption service periodically download their information to the provider's computer. This product ID code information would include the product to be discounted, the amount of discount, start date and expiration date. Prior to the start date of each discount, the membership provider's computer downloads the discounts assigned to each specific product to the merchant's store, as for example a grocery store.

Two main categories of advertising would generally be used by the membership provider. One would be a general notification of the discounts, such as in a newspaper, fliers, radio and TV ads, and indices at the merchant stores, etc., which would be aimed at members and non-members. This type of ad would attract new members to the discount redemption service by illustrating how much they can save by joining. Specific advertisements, such as mailings to members, would advise the membership of specials, discounts in areas of interest, etc. It is preferable that the stores be provided with signs or placards, or other markings, proximate the discounted products. In the case of a grocery store, the availability of a product discount can be positioned proximate the product information, such as price, price per unit of weight or volume, and the like. The identifying indicia can specify the discount or can merely display the logo of the discount service provider. By making the consumers aware of the savings at the store, impulse buying is increased and members who missed the ads can take advantage of the savings. Further, notification of savings at the store will entice new members to join the redemption service.

The consumer selects products to be purchased and brings all products, including those subject to discounts, to the cash register. The cashier enters the member's identification from the membership card by means appropriate to the memory storage, thereby activating the link with the membership provider's computer. The merchant's computer sends the consumer ID code to the membership provider's computer where the database is searched for an identification code match. The link-up activation can be through the activation of a computer modem and the programmed phone number or it can activate an independent system. The independent system can be pre-programmed with the phone number of the central or host computer or can be directly wired (hard wired) to the computer.

As the products are scanned, or otherwise entered into the merchant's computer, the merchant's computer continually searches the previously downloaded product database for a product match. When a product match is determined to exist, the computer then verifies the size, or other criteria to allow the product to qualify for a discount. Once all criteria are met for the discount, the computer deducts the discount from the product price. This can be done immediately after the entry of the product information or held for totaling at the end of the transaction. Once the transaction is complete, the merchant's computer then transmits the discount information to the provider's computer. As stated heretofore, all information regarding the products purchased can be transmitted rather than just the discounted items. This is determined by the arrangements with specific manufacturers and/or merchants.

Either during, or at the end of the transaction, the membership provider's computer receives, sorts and stores data relating to the purchased products. The stored information can include such information as the customer identification code, time and date of the transaction, specific items purchased, total dollar amount of the transaction, specific discounts applied to each discounted product and the total amount of the discount. The information can be downloaded in any desired combination, relative to a specific consumer, class of consumers, specific products or classes of products.

EXAMPLE II

As set forth in Example I, a consumer is provided with a membership card containing information specific to the individual consumer. The membership provider's computer is downloaded with consumer member information and manufacturer discount information. In this Example, however, the discount information is maintained in the membership provider's computer and not downloaded to the merchant's computer.

The system is activated by the membership card, opening a "channel" to the membership provider's computer. The information contained in each bar code, or its equivalent, is forwarded to the membership provider's computer and held in memory. The merchant's computer reads the bar codes, or other indices, as they are normally entered into the computer. The merchant's computer sends the read information to the membership provider's computer, matching the products purchased against product discount information. The membership provider's computer can either maintain all discounts in memory, transmitting the discounts at the end of the transaction, or immediately transmit each discount as it is matched. At the end of the transaction, the total discount received is deducted from the consumer's receipt. The deduction can be presented as an itemized list or a total deduction, depending upon merchant and/or membership provider's preference.

EXAMPLE III

In this Example the merchant does not have a computerized cash register but rather what is known as a "dumb terminal". The dumb terminal cannot process or store information, but rather simply works as a sophisticated calculator. The product information reader transmits the product code information directly to the terminal where it is processed. Once the merchant joins the redemption service, the information sent to the terminal is also sent to the membership provider's computer. At the end of the transaction, the membership provider's computer downloads either the total discount or the itemized discounts to the terminal for deduction and printing. The membership provider's computer is downloaded with information obtained by scanning the bar codes of the purchased products, thereby updating the membership database.

In the event the terminal cannot receive information from the membership provider's computer, a small LED screen can be provided which reads out the total of the discount. The discount total is then manually entered into the terminal. Some current scanners are provided with read out screens to register the price of the product as it is scanned. Depending upon the technology used in the scanner, it may be possible to send the total discount to the scanner's screen.

At some point during the product scanning process the cashier would scan the membership card memory storage, sending the consumer's membership number to the membership provider's computer. If the card is verified as valid, the provider's computer will process the discounts and transmit the total as stated above. If the card is not valid, the provider's computer will transmit a statement to that effect rather than the discount totals.

EXAMPLE IV

Many small, individually owned stores do not have product readers, computerized cash registers and, in some instances, even cash registers. In these instances several options can be utilized, all of which will be covered under this example.

Many merchants have the credit card verification machines which read the magnetic stripe on the credit card. The machine automatically contacts either the card provider or a verification service to verify the required data. The membership provider's computer can be linked to a verification service, as if the membership card were a standard credit card. By reading the memory storage, the verification machine would contact the service, thereby verifying validity of the consumer's membership.

The disclosed system provides benefits to consumers unable to easily shop at the store, whether for reasons of health, weather or time. The order can be placed through interactive TV, phone or computer, processed at the store and delivered to the consumer's home. The redemption system can also operate in conjunction with a credit card company, whereby the membership card can also charge the consumer's purchases. This avoids the necessity of having to pay cash to a delivery person. The membership credit card would provide further convenience to members by consolidating their food bill into one monthly payment. The member's reports can also be modified to reflect their credit card usage. The credit card can be limited to use at merchants who are members of the redemption service, thereby providing an additional benefit to the merchants.

The memory storage can be utilized to access other databases or information services. As an example, phone calls can be charged to a prepaid, or billed, account. The phone account can be either an independent account or part of the foregoing system. As a part of the disclosed redemption system, the information regarding consumer calling habits can be incorporated into the demographic material.

Merchants who cannot receive discounts electronically must reference the discounts through a hard copy. The merchants can be provided with a list of products currently receiving product discounts and would check each product against the list. Discount stickers can be provided as proof of purchase indicators and would be removed at the time of purchase. The discount stickers would be returned to the membership provider, similar to currently used coupons, and read into the membership provider's computer. The merchant would either manually enter the discounts into the cash register or deduct the discounts from the total. Alternatively the consumer can be provided with a coupon book corresponding to the computerized system. In this way, the merchants unable to electronically process discounts can either take the coupon from the book, or stamp the coupon, depending on the number of uses per coupon. The book also provides the advantages of providing a bridge between the current world of paper coupons and the paperless coupons of the instant system. The book would most likely be used for non-grocery coupons due to the vast number of grocery coupons available.

As used herein the term scanning bar coded data should be understood to include the optical scanning of bar codes as well as other mechanisms for downloading bar code information, including the reading of magnetically stored data. The term "profile" as used herein should be understood to mean a formal summary or analysis of data, often in the form of a graph or table, representing distinctive features or characteristics: as for example, a psychological profile of a job applicant or a biochemical profile of blood. In the present case the term profile refers to demographics information such as, the purchasing characteristics or habits of consumers and the sales characteristics merchandise.

Since other modifications and changes varied to fit particular operating requirements and environments will be apparent to those skilled in the art, the invention is not considered limited to the example chosen for the purposes of disclosure, and covers all changes and modifications which do not constitute departures from the true spirit and scope of this invention.

What is claimed is:

1. The method of processing and applying merchandise discounts to a consumer's purchases by providing a computerized membership system, said membership including a plurality of consumer members, a plurality of point of purchase merchant members, a plurality of manufacturer members, and a centralized system provider, said membership system having:

a point of purchase merchant member computer terminal and computer and a centralized provider's computer, said provider's computer having a database for the storage and retrieval of information, said database storing information regarding point of purchase merchant members, manufacturer members, and consumer members, in predetermined files, at least some of said information being entered into the system at the time of a member establishing membership in said system and communication means, said communications means providing real time communication between said member merchants' computer terminal and said provider's computer, comprising the steps of:
a. providing consumer members with individual identification codes, said identification codes accessing said databases;
b. storing said consumer member identification codes on said provider's computer in a consumer database;
c. providing each consumer member with a membership ID, said membership ID having memory storage means, said memory storage means containing at least said consumer identification code;
d. storing merchandise information provided by said manufacturer members in a manufacturer member database in said provider's computer, said merchandise information including at least a merchandise identification code and the discount on predetermined merchandise,
e. displaying to consumers indicia, said indicia identifying point of purchase merchandise subject to a price discount,
f. transporting, by said consumer, consumer selected discounted and non-discounted point of purchase merchandise to a purchase location at said merchant member to form a collection of transported merchandise, each of said transported merchandise having a merchandise identification code,
g. scanning merchandise identification codes of each of said transported merchandise, at said communication means,
h. scanning said consumer ID,
i. uploading said scanned consumer identification code, from said merchant member, through said communication means to said provider's computer,
j. comparing said consumer identification code with consumer identification codes stored in said provider's computer and verifying said consumer's membership,
k. uploading said merchandise identification code for each of said scanned merchandise from said merchant member's computer, through said communication means to said provider's computer,
l. comparing said uploaded merchandise identification codes with the identification codes of merchandise subject to a price discount,
m. computing the discounts on said merchandise subject to a price discount,
n. downloading to said merchant's computer through said merchant communication means, the discounts on said merchandise subject to a price discount, o. printing a sales slip for said member consumer including the discounts for said merchandise subject to a price discount, p. sorting and storing in said provider's databases said uploaded data on said consumer and said merchandise purchased by said consumer, q. storing merchant member sales data on said merchant member computer, wherein said provider maintains and processes, in real time, discounts provided by manufacturer members to member consumers without said member merchant being required to process said discounts or member consumers being required to present coupons or file rebates to obtain said discounts.

2. The method of claim 1, further comprising the steps of compiling consumer purchase data in a demographics database and providing demographic reports regarding consumer purchasing trends using stored database data.

3. The method of claim 1, wherein said indicia provides consumers with discount related information through at least one form of media advertisement.

4. The method of claim 1, wherein said indicia is displayed proximate merchandise subject to a price discount.

5. The method of claim 1 wherein said provider is a centralized computer networked to multiple unaffiliated merchants.

6. The method of claim 5 wherein said multiple, unaffiliated merchants have at least two stores.

7. The method of claim 1 wherein said provider is a centralized computer networked in real time communication to at least one merchant terminal.

8. The method of claim 1 wherein said communication means is a cash register.

9. The method of claim 1 wherein said provider's computer terminates the discounting of said discounted merchandise if said consumer identification code is not a valid identification code in said provider's computer.

10. The method of claim 1 wherein said sales slip displays information on said identified merchandise and non-identified merchandise.

11. The method of processing and applying merchandise discounts to a consumer's purchases by providing a computerized membership system, said membership including a plurality of consumer members, a plurality of point of purchase merchant members, a plurality of manufacturer members, and a centralized system provider, said membership system having:

a point of purchase merchant member computer terminal and computer and a centralized provider's computer, said provider's computer having a database for the storage and retrieval of information, said database storing information regarding point of purchase merchant members, manufacturer members, and consumer members, in predetermined files, at least some of said information being entered into the system at the time of a member establishing membership in said system and communication means, said communications means providing real time communication between said member merchant's computer terminals and said provider's computer, comprising the steps of:

a. providing consumer members with individual identification codes, said identification codes accessing said databases;

b. storing said consumer member identification codes on said provider's computer in a consumer database;

c. providing each consumer member with a membership ID, said membership ID having memory storage means, said memory storage means containing at least said consumer identification code;

d. storing merchandise information provided by a manufacturer member in a manufacturer member database in said provider's, said merchandise information including at least a merchandise identification code and the discount on predetermined merchandise, e. displaying to consumers indicia, said indicia identifying point of purchase merchandise subject to a price discount, f. transporting, by said consumer, consumer selected discounted and non-discounted merchandise a purchase location at said merchant member to form a collection of transported merchandise, each of said transported merchandise having a merchandise identification code, g. scanning merchandise identification codes of each of said transported merchandise, at said communication means, h. scanning said consumer ID, i. uploading said scanned consumer identification code, from said merchant member, through said communication means to said provider's computer, j. comparing said consumer identification code with consumer identification codes stored in said provider's computer and verifying said consumer's membership, k. uploading said merchandise identification code for each of said scanned merchandise to said merchant member's computer, l. comparing at said merchant's computer, said merchandise identification code for consumer selected merchandise with the identification codes of said discounted merchandise, m. computing the discounts on said merchandise subject to a price discount, n. uploading to said provider's computer merchandise codes for merchandise subject to a price discount, o. downloading from said provider's computer to said merchant's computer through said merchant communication means, discounts on said merchandise subject to a price discount, p. printing at said merchant member's computer terminal a sales slip for said member consumer including the discounts for said merchandise subject to a price discount, q. sorting and storing in said provider's databases said downloaded data on said consumer and said merchandise purchased by said a member consumer from a member merchant, and r. storing merchant member sales data on said merchant member computer, wherein said provider maintains and processes, in real time, discounts provided by manufacturer members to member consumers without said member merchant being required to process said discounts or member consumers being required to present coupons or file rebates to obtain said discounts.

* * * * *